United States Patent [19]
Carsten et al.

[11] 3,898,619
[45] Aug. 5, 1975

[54] OBJECT LOCATION/IDENTIFICATION SYSTEM

[75] Inventors: Bruce W. Carsten, North Vancouver; Stanley Knotek, Vancouver, both of Canada

[73] Assignee: Glenayre Electronics, Ltd., North Vancouver, Canada

[22] Filed: June 29, 1973

[21] Appl. No.: 374,914

[52] U.S. Cl............................. 340/152; 340/258 C
[51] Int. Cl.².... G01S 9/56; H04Q 7/00; H04Q 9/00
[58] Field of Search....... 340/152 T, 152 R, 171 PF, 340/151, 258 C; 343/6.5 SS

[56] References Cited
UNITED STATES PATENTS

| | | | |
|---|---|---|---|
| 3,206,728 | 9/1965 | Baumgart et al................ | 340/152 T |
| 3,264,614 | 8/1966 | Hellstrom....................... | 340/152 R |
| 3,438,489 | 4/1969 | Cambornac..................... | 340/152 R |
| 3,573,894 | 4/1971 | Bachofer et al................ | 340/258 C |
| 3,689,885 | 9/1972 | Kaplan et al.................... | 340/152 T |
| 3,737,858 | 6/1973 | Turner et al..................... | 340/151 |
| 3,740,550 | 6/1973 | Geiger............................ | 340/171 PF |
| 3,745,569 | 7/1973 | Works et al..................... | 343/6.5 SS |
| 3,754,250 | 8/1973 | Bruner............................ | 340/152 T |

*Primary Examiner*—Donald J. Yusko
*Attorney, Agent, or Firm*—Christensen, O'Connor, Garrison & Havelka

[57] ABSTRACT

A system for identifying a particular object with respect to other such objects, or locating a particular object within a specified area of use. A plurality of responder units, in combination with at least one interrogator-receiver unit, are provided in the system. Each responder unit may be actuated by predetermined signals from the interrogator-receiver unit, or by means of its own separate power supply. The responder unit generates and transfers back to the interrogator-receiver a coded signal which is unique to that particular responder and which thus identifies the location of that responder in the system. The unique coded signal data transferred to the interrogator-receiver will, after detection by the receiver, be in turn transmitted to a central data unit for display purposes or further information processing. The individual responder units may be placed within moving objects such as vehicles, and the interrogator location remaining fixed, or in another system configuration, the responder units may be positioned at strategic locations within a specified area, while individual interrogator-receiver units are placed on the moving objects, such as vehicles. Signal transfer between the individual responders and the interrogator receivers is accomplished by means of inductive coupling through use of resonant circuits.

12 Claims, 5 Drawing Figures

FLUX LINES

OBJECT LOCATION/IDENTIFICATION SYSTEM

BACKGROUND OF THE INVENTION

This invention relates generally to interrogator-responder location/identification systems, and more specifically, to such systems utilizing inductive coupling for data transfer. Modern mass transportation systems, such as high speed subways, railroads, municipal bus systems, and other similar systems using a large number of vehicles in a specified area require systematized vehicle control to be most effective. To date, location and identification control over vehicles in such systems has typically been accomplished by scheduling the routes, stopping points, and interval time of the system vehicle. These systems have proved generally unreliable in maintaining accurate, real time knowledge of a particular vehicle's location within a system, particularly in large scale or high speed operations such as railroads or urban mass transit applications.

Many types of identification systems for maintaining vehicle location/identification control in such systems have been introduced in the past few years. Nearly all of the systems, however, suffer from high power requirements, expense, and a lack of reliability and ruggedness. These include many configurations of interrogator-responder systems, in which typically an interrogator unit is placed on a moving vehicle in the system and a plurality of responders is located at specified positions within the area of use, such as along a railroad track.

In such systems in general, a great number of responder units are necessary, and they are required to operate under extreme environmental conditions. Thus, the individual responder units must be inexpensive, require very little power, utilize no self-contained power sources, and be extremely rugged. To date, in those interrogator-responder systems utilizing passive-type responder devices, the generation of sufficient unique codes to satisfy large scale requirements has been difficult, and not completely satisfactory. Thus, there is at the present time a significant need for vehicle location/identification systems which are flexible in use, which are very reliable in operation and which can operate under extremes of environmental conditions, yet which are sufficiently inexpensive so that a great number of individual units may be used in the system for preciseness of vehicular location/identification.

In accordance with the above, it is a general object of the present invention to overcome the disadvantages of the prior art.

It is another object of the present invention to provide an object identification/location system using interrogator-responder units.

It is a further object of the present invention to provide an object identification system in which the responder portion of the system does not require a self-contained power supply.

It is yet another object of the present invention to provide an interrogator-responder system wherein signal data may be transferred between interrogators and responders by means of inductive coupling.

It is still another object of the present invention to provide an interrogator-responder system utilizing large numbers of responders in which each responder generates a unique code.

SUMMARY OF THE INVENTION

Accordingly, the system of the present invention includes at least one interrogator-receiver unit and a plurality of responder units. Each of the responder units, when energized by the interrogator-receiver unit, or by its own power supply, generates and transfers a coded signal which is unique to that specific responder. Each responder includes means for generating a clock signal from an energizing signal, which clock signal in turn drives a code generating means. The information identifying the responder contained in the signal is independent of the energizing signal. This coded signal is then transferred by inductive coupling to the interrogator-receiver, which must be located within a given proximity to the responder to receive the coded signal. The receiver detects the coded signal and retrieves the data which identifies the individual responder. This detected data is then utilized for purposes of display or other processing for vehicle location.

DESCRIPTION OF THE PREFERRED EMBODIMENT

Figure 1:
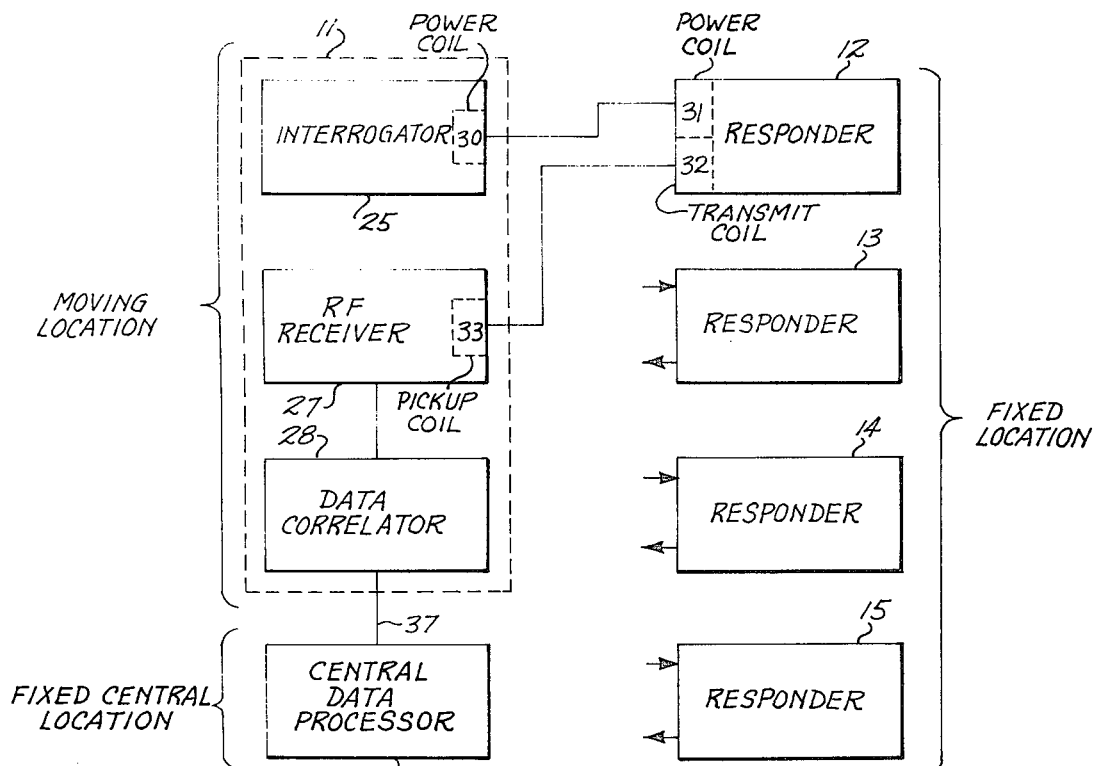
FIG. 1 is a block diagram of a vehicle location system wherein the responder units are positioned at fixed locations and the interrogator units are located on moving objects such as vehicles.
Figure 2:
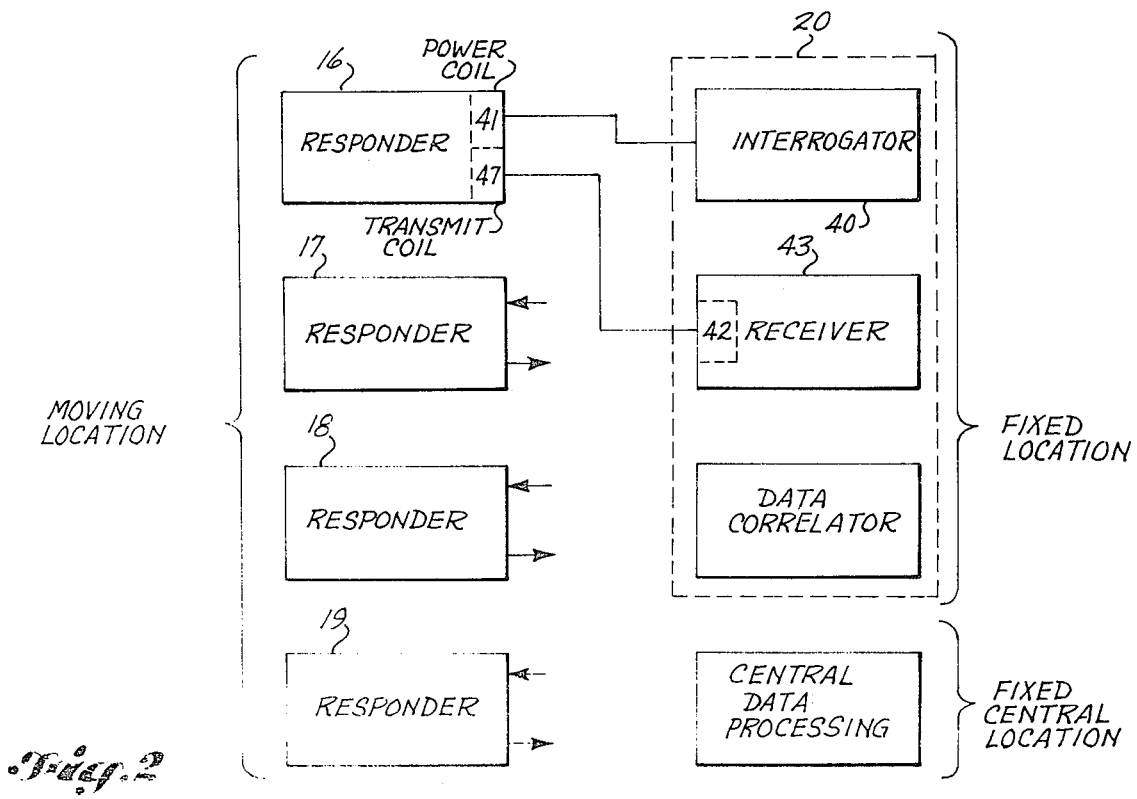
FIG. 2 is a block diagram of a vehicle location system wherein the responder units are located on moving objects such as vehicles, and the interrogator-receiver units are located at fixed positions.

Referring to FIGS. 1 and 2, two basic system configurations utilizing the principles of the present invention are illustrated. FIG. 1 is a diagram of a system which may be conveniently used in a mass transportation system such as a railroad, wherein an interrogator unit 11 may be placed on the moving train or other vehicle, and wherein a plurality of individual responder units, i.e., 12–15 are located at specified intervals in the area, such as along a railroad track. FIG. 2, on the other hand, is a diagram of a system which may be conveniently used in an urban bus system, wherein individual responder units 16–19 are placed on the buses, and interrogator-receiver units 20 are placed at specified positions in the roadway. In both cases, data from the receiver may be transmitted, through a signal link to a central data processing station for data display and/or processing. Thus, the configuration of the location-/identification system with respect to the use of individual interrogator-receiver units and responder units may be easily varied to accommodate the ease of a particular application. Other system configurations utilizing the basic use described above would occur to the man skilled in the art given the basic teachings of the system to be described in the following paragraphs.

Referring again to FIG. 1, the interrogator-receiver unit 11, comprising generally a self-powered interrogator 25, an RF receiver 27, and data correlator circuitry 28 generates a signal which is coupled to a responder device 12 through power coils 30 and 31 in the interrogator 25 and the responder 12 when the interrogator unit 11 comes within a certain physical proximity of a responder, for instance 20 inches. The responder 12, having no self-contained power supply, utilizes the signal received from the interrogator as a clock signal, the clock signal having a frequency equal to the signal generated by the interrogator oscillator (not shown). This frequency is 200 kHz in the present invention. This clock signal in turn drives circuitry for generating a unique coded signal. This coded signal is then used to key a high frequency oscillator, the output of which is then transferred by means of a transmit coil 32 in the responder 12 back to a pickup coil 33 in the interrogator-receiver unit 11.

This complete signal transfer from the interrogator-receiver unit 11 to the responder 12 and back again occurs during the time that the interrogator-receiver unit 11 is within the required physical proximity to the responder 12. The RF receiver 27 detects the data present in the received coded signal, then applies the data to standard data correlator circuitry 28, where it is properly synchronized with a clock signal of the same frequency as the responder clock frequency, and then validated. This detected and validated data may then be transmitted by means of an RF link 37 to a central data processing unit 38, where the data may either be displayed on a location board, for instance, or further processed. By providing such a system wherein the individual interrogator units located on a moving train have a unique identity, and wherein a plurality of responder devices are located at fixed intervals along the railroad track, each of which is uniquely identified by means of a coded signal, the RF receiver in the interrogator-receiver unit may thus transmit to a central location precise information concerning the location and identification of a particular train unit in the overall railroad system.

Referring to FIG. 2, the responders 16–19 located on moving vehicles may either be actuated by an interrogation signal from an interrogator 40, as in the previous system described above, or the responder 16 may be separately powered by means on the vehicle. In the latter circumstance, the interrogator 40 and responder power coil 41 would be unnecessary and may be eliminated from the system, although a responder oscillator would be required, providing the clock signal which in turn is used to drive the code-generating circuitry in the responder. Each coded signal is unique to the responder which generates it, and thus uniquely identifies the vehicle, i.e., bus, in the system carrying the responder. Interrogator-receiver units 20 are typically buried in the roadway of the route for the bus. As the vehicles carrying the responders come into physical proximity with the buried interrogator units, the signal from the responder will be coupled from the transmit coil into the pickup coil 42 of the receiver 43. The receiver detects the coupled data, as in the system described above, and applies the data to a correlator 44, which in turn transmits it to a central processor 45 for display or further processing. In such a system, the responder devices will typically be located on every bus or other vehicle in the system, and the interrogator-receiver units will be buried at predetermined intervals in the roadways over which the vehicle in the system will pass. In such a system it is possible that the responder will be able to generate information concerning not only its unique code but also information concerning the present number of passengers or other pertinent operating information back to the receiver 43. Thus, where a significant amount of information may be desirable with respect to individual vehicles, responder units having their own supply of power via the vehicle may be placed on each vehicle in the system.

Figure 3:
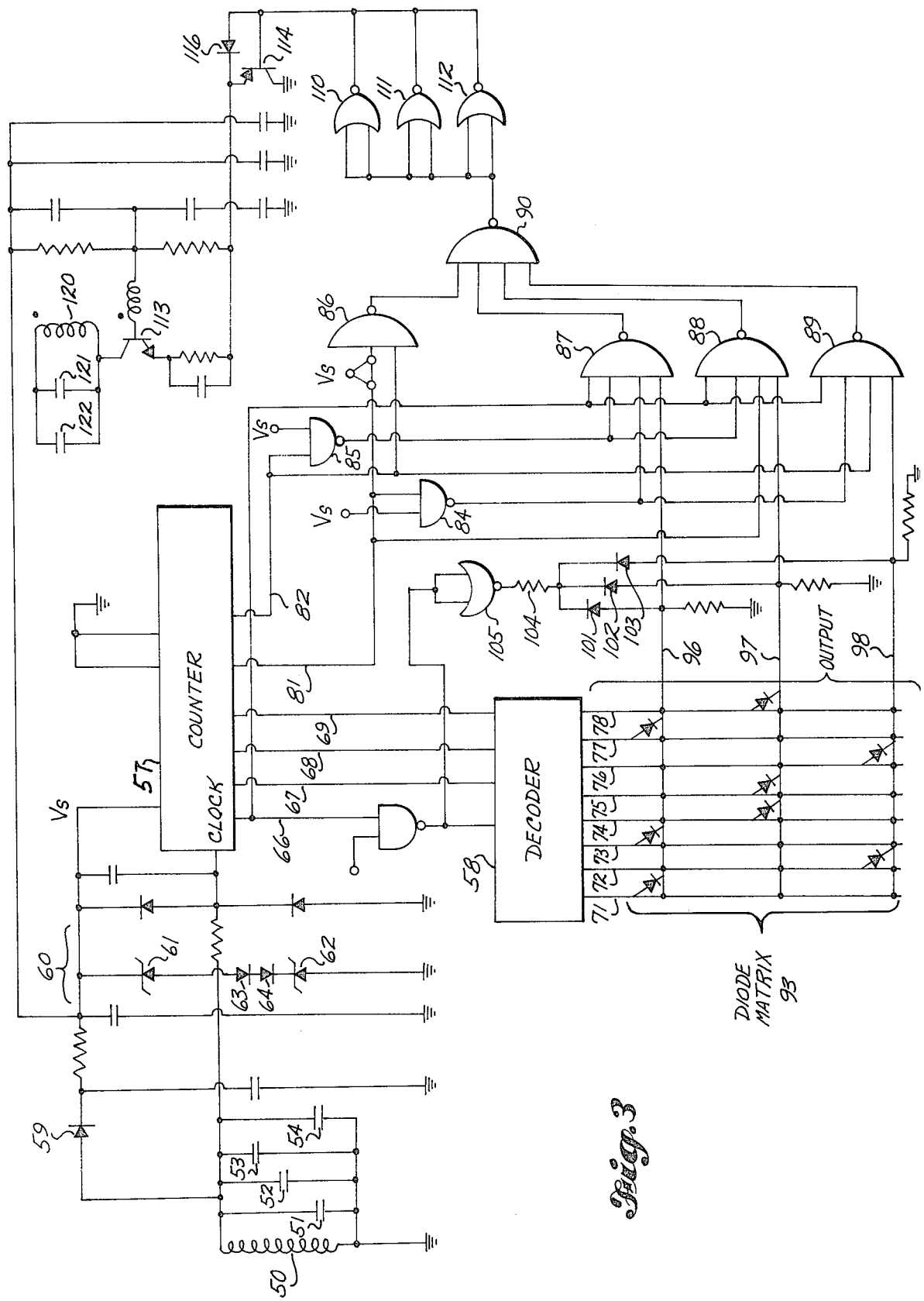
FIG. 3 is a schematic diagram of a responder unit of the present invention.

Referring now to FIGS. 1 and 3 for a more detailed explanation of the present invention in the context of a rail system, the interrogator 25, located on a moving vehicle is typically comprised of a sine wave oscillator (not shown) in combination with a power coil and a tuning capacitor (not shown) forming a resonant circuit. A 200 kHz sine wave signal is generated by the oscillator which provides typically 50 watts of power into the resonant circuit which is mounted horizontally with respect to the railraod track. Higher power levels are frequently necessary under special coupling conditions, i.e., when one of the units is buried in a roadway having embedded wire mesh, such as in a mass transit bus system. The 200 kHz sine wave at 50 watts is continuously present in the resonant tuned circuit formed by the power coil 30 in the interrogator, and the associated tuning capacitor (not shown). In operation, the train or other vehicle carrying the interrogator-receiver unit 11 will, at selected intervals, come within correct physical proximity with one of a series of responding devices 12–15 fixed to the railroad track at selected intervals, as explained above. In the present invention, sufficient inductive coupling between the power coil 30 of the interrogator, and the likewise horizontally mounted power coil 31 of the responder to energize responder 12 occurs at an approximate distance of 20 inches. At this point, the responder 12 begins operation.

Referring to FIG. 3, a schematic diagram showing the details of a responder unit of the present invention is shown. When an interrogator-receiver unit is within correct range of a responder unit, a 200 kHz sine wave signal is inductively coupled into power coil 50 of the responder. A resonant circuit is formed of power coil 50 and tuning capacitors 51–54. The 200 kHz induced signal is applied directly through resistor 56 to a seven-stage binary counter 57 as a clock signal. The counter 57 begins then to count at the 200 kHz rate. The supply voltage $V_s$ for the otherwise passive responder unit is achieved by means of a diode rectifier 59 and the regulator circuit 60 formed principally of zener diodes 61 and 62 as well as diodes 63 and 64. The regulator circuit limits the voltage input so that close proximity between the power coil of the interrogator unit and the responder unit will not result in responder damage due to excessive power supply voltages.

Counter 57 is a conventional seven-stage binary counter having 6 output stages in use. Output lines 66, 67, 68 and 69 are connected to a conventional 1-of-8 decoder circuit 58 which provides successive signals on output lines 71–78 when energized by the counter 57. Output lines 81 and 82 of the counter 57 are connected to NAND gates 84 and 85, along with the power supply voltage $V_s$. Line 82 is also provided as a constant input to gate 86. The other input to gate 86 is either $V_s$ or line 81, depending on the actual desired application, the bit length of the synchronization pulse, and hence the code data pattern, being dependent on which input is used. The length of the entire code signal, however, remains the same.

The signal generated by the diode matrix 93, showing a fanciful diode arrangement for illustration purposes only, in combination with NAND gates 84–90 is a 32-bit signal which uniquely identifies a particular responder in the vehicular system. For the example using line 81 as an input to gate circuit 86, this 32-bit signal comprises an 8-bit synchronization pulse envelope at the start of the signal transmission, followed by five 4-bit information words referred to as the code data pattern, which identify the responder uniquely and finally a 4-bit parity and data validation word. Each bit period in the signal is 10 microseconds, and each data bit is comprised of two timing portions, the first portion of 5 microseconds in all cases being a low, while the second 5 microsecond portion may be high or low depending on whether the data to be transmitted is a zero or a one, as determined by the particular arrangement of diodes in the matrix 93. The synchronization pulse is constantly high.

The output signals of the 1-to-8 decoder 58 applied on lines 71–78 are used as inputs to the diode matrix 93. Conventional diodes are connected at preselected positions in the matrix, and their configuration establishes the code data pattern used to identify the individual responders. The output lines 96–98 of the matrix are connected to NAND gates 87–89, respectively, each output line being energized when a signal path exists between that output line and the particular line 71 through 78 which is at that instant also energized. Other inputs to data NAND gates 87–89 are taken from the counter 57, and from NAND gates 84 and 85 as shown. The outputs of NAND gates 87–89 will be high when any of the four inputs is low, and will be low when all of the inputs are high. The outputs of NAND gates 87 through 89 are then applied to another four-input NAND gate 90, along with the output of NAND gate 86, which controls NAND gate 90 to provide a continuous 8-bit envelope pulse at the start of the signal. At the end of this 8-bit period, the output of NAND gate 86 goes high. The output of NAND gate 90, which is controlled by the outputs of NAND gates 86 through 89, provides the 32-bit signal which is to be coupled back to the interrogator-receiver.

As mentioned above, each of the data bits comprises two parts, a first 5 microsecond low portion and a second 5 microsecond portion containing the actual binary data. Diodes 101, 102 and 103 with resistor 104 and NOR gate 105 provide a fast discharge circuit for the individual output lines 96–98 of the matrix 93, such that relatively sharp pulse transmissions may be achieved on lines 96–98.

The output of NAND gate 90 is then applied to three parallel NOR gates 110–112, which provide the signal current strength necessary to key the output oscillator. When the output of the NOR gates 110–112 is low, the 27 MHz oscillator comprised of transistor 113 and associated circuitry is turned on by transistor 114. Alternatively, when the output of the NOR gates is high, diode 116 blocks the signal and the oscillator is keyed off. Thus, the 27 MHz oscillator is keyed on and off in accordance with the signal data generated by the previously described diode matrix/NAND gate complex, and coupled by the three parallel NOR gates 110–112 to transistor 114 and diode 116. The keying rate is derived from the clock frequency of the responder.

The output energy of the keyed 27 MHz oscillator is applied to a resonant circuit, comprising transmitter loop 120 and tuning capacitors 121 and 122, which then couples the signal energy back to the interrogator-receiver unit 11 (FIG. 1). Specifically, the energy is coupled to pickup coil 33 in the RF receiver portion 27 of the interrogator-receiver unit.

Figure 4:
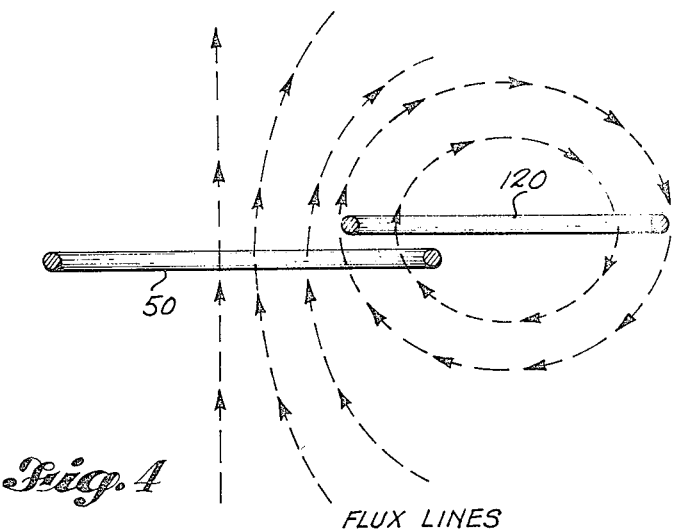
FIG. 4 is a diagram showing the physical relationships of the power coil and the transmitting coil within a responder unit.

In physical arrangement, the 200 kHz power coil 50 of the responder is located parallel with the 27 MHz transmitting loop coil 120. This arrangement of the two coils allows for considerable savings in physical space in the responder. Referring to FIG. 4, a side view of the physical orientation of the two loops is shown. The two coils are overlapped in such a configuration that the circulating current in one loop does not induce any current in the other, i.e., any positive actual flux linkage between the two coils is cancelled by equal and opposite negative flux linkage. This physical arrangement of the coils allows the two coils to be placed within close proximity to each other, thus saving space in the responder unit without reducing the Q of either of the two coils.

Figure 5:
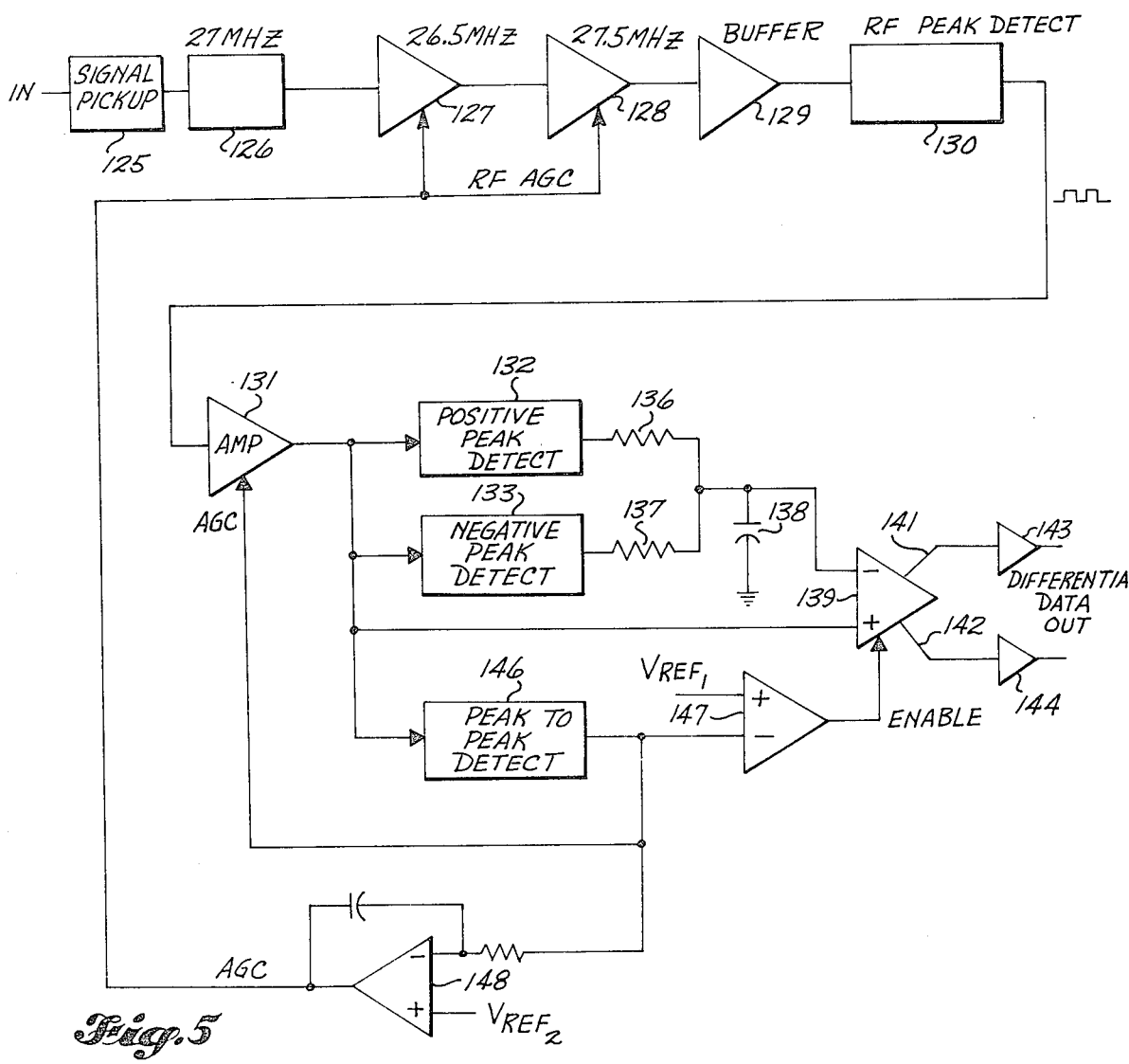
FIG. 5 is a block diagram of the receiver portion of the interrogator-receiver unit of the present invention.

FIG. 5 shows a block diagram of the RF receiver portion 27 (FIG. 1) of the present invention. At the input end of the receiver, a signal pickup circuit 125, including a receiving coil (not shown) is tuned to receive the 27 MHz signal energy coupled into the receiver by the transmitter coil 120 in the responder. The output of the resonant circuit 125 is then applied to a band pass filter 126 and two stagger tuned amplifiers 127 and 128. Amplifier 127 is tuned to 26.5 MHz and amplifier 128 is tuned to 27.5 MHz. This series of filters and amplifiers provides wide band amplification for the RF receiver. The output of the 27.5 MHz amplifier 128 is then applied to a standard buffer amplifier 129, the output of which is applied to an RF peak detector circuit 130. The peak detector utilizes a zener diode (not shown) for a DC reference, and provides a pulse output at a 100 MHz rate, having a peak-to-peak voltage of 10 to 20 millivolts.

The output of the peak detector 130 is then applied to an operational amplifier 131, which amplifies the detected data and inverts it, resulting in an approximate 1 volt peak-to-peak inverted data output signal. This signal is then applied to a positive peak detector 132, and a negative peak detector 133. These detected values are then averaged by resistors 136 and 137. This averaged value is stored in capacitor 138, and is theoretically equal to the voltage center value of the amplified data signal from amplifier 131. This value of averaged data voltage is then applied as one input to comparator 139, which compares this averaged voltage value with the amplified data input taken directly from amplifier 131. The comparator 139 has two outputs 141 and 142, one output being the actual data generated by the responder, and the other being that same data inverted, or $\overline{data}$. These two outputs are then amplified in amplifiers 143 and 144, and then applied to succeeding circuits for validation and display, or further processing.

The output of the operational amplifier 131 is also applied to a standard peak-to-peak detector 146, the output of which is then applied directly back to the operational amplifier 131 as an automatic gain control signal, while also being applied to operational amplifiers 147 and 148 which are connected to perform a comparison function. When the peak-to-peak value of the output of amplifier 146 reaches a level above that of $V_{ref_1}$, or approximately 6 volts, the output of amplifier 147 enables the operation of amplifier 139. The operation of amplifier 147 thus inhibits the output of data from the receiver when either the data level is too low, or just 27 mHz noise is being received. It provides a voltage threshold condition for the circuit before it begins to output data.

Operational amplifier 148 has a voltage$_{ref}$ input, approximately 12 volts, and it compares the output of the peak-to-peak detector 148 with this value of $V_{ref_2}$. The output of the comparator 148 is then applied to amplifiers 127 and 128, acting as an automatic gain control signal for those two circuits, respectively.

The output of the Rf receiver 27 (FIG. 1) may then be passed via a transmission line or other linking means through a standard correlator circuit 28, where a clock signal having a frequency equal to the responder clock frequency is synchronized with the individual data pulses in the code signal. The data pattern pulses may then be validated for proper bit configuration and sequence. The valid data pattern pulses then are passed by means such as an RF link or transmission line to a central information processing station 38 wherein the data may be visually displayed or further manipulated with respect to other received data by peripheral data processing equipment.

Although an exemplary embodiment of the invention has been disclosed herein for purposes of illustration, it will be understood that various changes, modifications and substitutions may be incorporated in such embodiment without departing from the spirit of the invention as defined by the claims which follow.

What is claimed is:

1. An object location/identification system comprising a transceiver means and at least one unpowered responder means and further comprising:

means in said transceiver means generating a continuous alternating current interrogating clock signal having a predetermined frequency;

first means in said transceiver means and said responder means for inductively coupling said interrogating clock signal from said transceiver means to said responder means;

resonant circuit means in said responder means for detecting said interrogating clock signal;

circuit means in said responder means generating a DC power signal from said detected interrogating clock signal;

counter means in said responder means responsive to said detected interrogating clock signal and powered by said DC power signal for generating output pulses at predetermined counts of said interrogating clock signal;

means in said responder means responsive to said output pulses for generating a pulse series signal representing code data uniquely identified with said responder means, said pulse series signal having a repetition rate derived from said interrogating clock signal;

means in said responder means powered by said DC power signal for generating a data carrier signal having a frequency substantially greater than said predetermined frequency of said interrogating clock signal;

means in said responder means for controlling said data carrier signal generating means with said pulse series signal to produce an intermittent data signal, said code data being represented in binary format, the presence of said data carrier signal representing one binary state and the absence of said data carrier signal representing the other binary state; and second means in said responder means and in said transceiver means inductively coupling said intermittent data signal from said responder means to said transceiver means.

2. The system of claim 1, wherein said first inductive coupling means includes in the transceiver a first resonant circuit, said first resonant circuit further including a first transmitting coil, said first inductive coupling means further including in the responder a second resonant circuit, comprising a first power coil and at least one tuning capacitor.

3. The system of claim 2, wherein said second inductive coupling means includes in the responder a third resonant circuit, said third resonant circuit further including a second transmitting coil.

4. The system of claim 3, wherein said first power coil and said second transmitting coil are positioned in said responder means to lie in spaced, substantially parallel planes, and further sufficiently overlap each other to result in substantially zero flux coupling between said first power coil and said second transmitting coil in operation.

5. The system of claim 1, wherein said second inductive coupling means includes in the transceiver means for receiving said intermittent data signal coupled from the responder, said intermittent data signal having positive and negative peaks, and wherein the transceiver further includes means for detecting said intermittent data signal, said detecting means including means for detecting said positive and negative peaks of said intermittent data signal, and means for determining an average value therebetween, and further including means for comparing said average value with the instantaneous magnitude of said detected intermittent data signal, said comparing means generating an output signal having one magnitude when said average value is greater than said instantaneous magnitude of said intermittent data signal, and having a second magnitude when said average value is less than said instantaneous magnitude of said detected intermittent data signal, said output signal thereby providing a reliable indication of said code data uniquely identified with the responder means.

6. The system of claim 5, wherein said detecting means further includes filter means tuned to pass said data carrier signal frequency, an RF peak detector responsive to said filter means, said RF peak detector producing a pulse output, an inverting amplifier, means applying said pulse output to said inverting amplifier, and positive and negative peak detectors, said inverting amplifier having an output which in turn is applied simultaneously to said positiive and negative peak detectors, said average value determining means including first and second resistance means and a storage capacitor, said first and second resistance means being connected, respectively, between said positive and negative peak detectors and one side of said storage capacitor, the voltage appearing on said storage capacitor being said average value of said intermittent data signal, and means connecting one side of said capacitor to one input of said comparing means.

7. The system of claim 1 wherein said means for generating a pulse series signal includes a diode matrix and gating means, said diode matrix having a series of outputs and responsive to a first group of predetermined outputs of said counter, and wherein said gating means is responsive to said series of outputs of said diode matrix and other outputs of said counter for producing said code signal.

8. The system of claim 7, wherein said diode matrix includes a plurality of input lines and a plurality of diodes connecting selected input lines to selected outputs of said diode matrix, said first group of selected outputs of said counter means being coupled to successive ones of said diode matrix input lines.

9. The system of claim 1, wherein said transceiver means and said unpowered responder means are, in operation, moving relative to one another and wherein signal coupling therebetween occurs whenever said transceiver means and said unpowered responder means are sufficiently close in physical proximity to one another to permit inductive coupling therebetween.

10. The system of claim 9, wherein said transceiver is stationary and said responder is moving.

11. The system of claim 10, wherein said transceiver is moving and said responder is stationary.

12. The system of claim 1, wherein said coded data includes synchronizing information bits and responder identification bits, and wherein said apparatus includes means for altering the number of responder identification bits without altering the total number of coded data bits.

* * * * *